United States Patent
Kinsey

[15] 3,668,958
[45] June 13, 1972

[54] AUTOMATIC DISK CUTTER

[72] Inventor: Robert E. Kinsey, 16 Westwood Road, Augusta, Maine 04330

[22] Filed: Nov. 5, 1970

[21] Appl. No.: 87,233

[52] U.S. Cl. .................................... 83/88, 83/94, 83/96, 83/411, 83/430
[51] Int. Cl. ................................................ B26d 7/06
[58] Field of Search ............... 83/86, 88, 94, 96, 267, 411, 83/417, 430

[56] References Cited

UNITED STATES PATENTS 3,435,716  4/1969  Sjostrand ........................... 83/430 X

*Primary Examiner*—Andrew R. Juhasz
*Assistant Examiner*—David R. Melton
*Attorney*—Hugh Adam Kirk

[57] ABSTRACT

A continuous rotary cutter which cuts disks from square sheets, such as paper, from a roll of stock. The square sheets are fed from one tape conveyor to another of a slower speed for overlapping and stacking a predetermined number of sheets, which stack is fed to and grabbed by a pair of retractable spears which pierce the stack of sheets near its corners and pull it onto the disk cutting table against a pair of continuously rotating cutting disks. A collection platform for the stack may also be used for supporting the stack to be grabbed by the spears, and it may be retracted for disks larger in diameter than the pulling distance of the spears to insure release of the stack onto the cutting table. The sheets on the cutting table are then clamped together axially at their centers by a downward reciprocable rotatable center clamping pivot means which presses the sheets against a rotatable central portion of the cutting table. Then one of the two spears releases while the other spear positively moves the stack tangentially of the periphery of the disks to be cut to start the stack of sheets rotating through the continuous disk cutters, the friction of which cutters continue to rotate the sheets about the center clamping pivot means. As soon as the disks are cut, an edge clamping pivot means near the periphery of the cut disks engages the stack of cut disks so that the rotational inertia of the disks imparted by the cutters causes the disks to rotate about this edge clamping pivot means to move them from the cutting table and under the take-off rollers of the discharging conveyor, and thus provide room for the next stack of sheets to be cut. The overlapping stacks of cut disks may be fed by an up-from-the-bottom type stacker conveyor or elevator onto a pallet for removal from the machine. The feeding means, center clamping means, and take-off means for the cut disks may be adjustable simultaneously, towards and away from the disk cutters for cutting different diameter disks.

20 Claims, 7 Drawing Figures

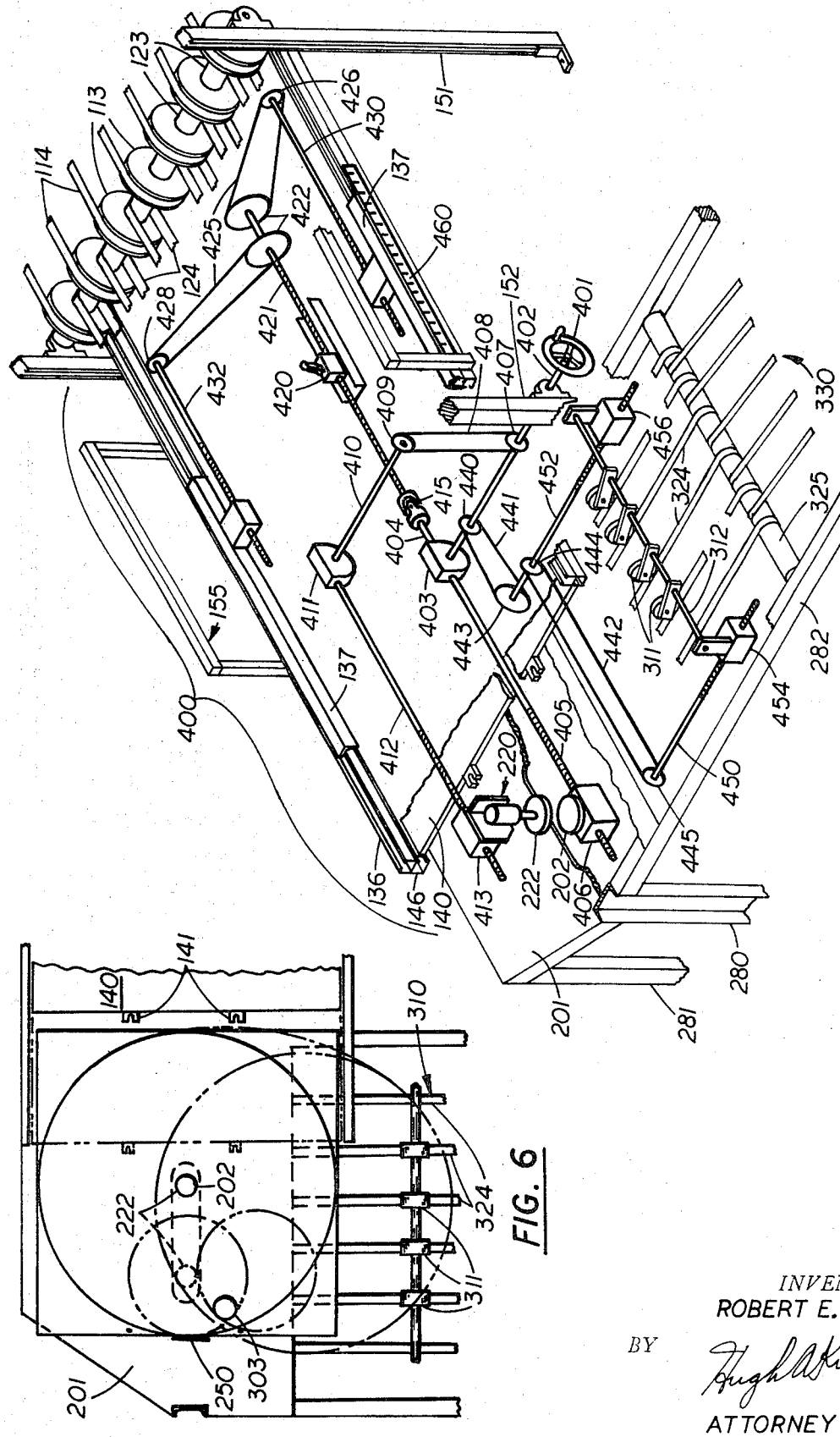

//  3,668,958

AUTOMATIC DISK CUTTER

BACKGROUND AND OBJECTS OF THE INVENTION

Previously such sheets of paper were moved to a cutter and removed therefrom manually by one or more operators, and if different sized sheets were to be cut, a shutdown and complete readjustment of the machine was required.

Accordingly it is an object of this invention to increase the speed of cutting disks from square sheets and to do so automatically.

Another object is to produce such a machine which will cut a plurality of disks simultaneously, such as a stack of paper sheets about one-tenth of an inch in thickness, in a few seconds time, so that from about 20 to 120 disks can be cut per minute depending upon the number in each stack and the size of the disks.

Another object is to provide such a machine which is easily and quickly adjustable such as by a single hand-wheel on the machine for cutting different sized disks from about 2 to 6 feet in diameter.

SUMMARY OF THE INVENTION

Generally speaking, the machine of this invention comprises a feeder, a cutter, and a discharger, which machine feeds intermittently stacks of square sheets onto a cutting table against continuously rotating stationary cutter disks, rotating the stack of sheets through the cutters, and then utilizing the inertia of the rotating cut disks for discharging them from the cutting table.

The feeder for the sheets comprises several sections, the first of which is a slightly downwardly tilted first conveyor of a plurality of spaced belts or tapes for successively receiving the cut square sheets, such as from a roll of paper feeding a transverse cutter. This first conveyor transfers the square sheets to a slower moving also downwardly tilted second tape conveyor to produce, against a stop, a stack of a predetermined number of said square sheets. This slower second conveyor may be driven from the same shaft as the first conveyor, but by smaller diameter pulleys for the tapes or belts. When the stop is removed, the stack of square sheets passes onto a similarly downwardly tilted adjustable third tape conveyor or sheet delivery carrier which deposits the stacks onto a collection table or retractable platform, which platform may overlap the cutting table and is reciprocated away from the cutting table when larger sheets are to be cut. At the forward edge of this reciprocating platform are provided a pair of spaced forks or anvils which cooperate with a pair of spears mounted on a horizontally reciprocating traverse carriage. Each of these spears has a retractable stop or abutment to support the edge of the collecting table against the force of the spears which operate to grab or pierce the sheets in the to-be-cut-off corner portions of the stack. Then the traverse carriage pulls the stack onto the cutting table while the stope are retracted and until the center front edge of the stack between the spears is against the continuously rotating disk cutters. If the sheets are larger in diameter than the distance which the spears or traverse carriage may pull the sheets, the overlapping delivery carriage or platform simultaneously moves backwards as the traverse carriage moves toward the cutters so that the full sheet will drop upon the cutting table.

As soon as the stack of square sheets is on the table, a first vertically reciprocating center clamping pivot means having a rotatable clamping disk as its bottom moves downwardly against the center of the stack of sheets to hold them against a center rotatable portion on the cutting table. Once the centers of this stack of disks are so clamped, the one spear in the way of the rotation of sheets is released by being retracted, while the other spear is pushed tangentially to the radius from the center clamping pivot means to start the stack of sheets rotating in the cutting direction before releasing its spear. This rotation is continued by the friction of rotating disk cutters, and is sufficiently fast to cause the cut-off corners of the square sheets to be spun off into a bin adjacent the machine.

When the stack of sheets has made one complete rotation and the stack of disks are cut therefrom, the central clamping pivot means is raised simultaneously with the lowering or engagement of a similar but edge clamping pivot means adjacent the periphery of the disks, so that the moment of inertia of the rotating disks will then rotate around this edge clamping pivot means causing the disks to spin out from the cutting table and under the take-off rollers on the take-off tape conveyor. Below this edge clamping pivot means there may be an edge rotatable portion on the cutting table, about which the stack is now being pivoted. Connected to the take-off tape conveyor and driven by a common shaft therewith, there may be horizontally pivoted axially of this shaft an up-from-the-bottom elevator tape conveyor for stacking the cut disks on a pallet.

Either or both of the cutting table clamping pivot means or their cooperating cutting table rotating portions, may be positively driven, if more energy is needed for rotating the stack of sheets or disks.

Adjacent the feed conveyor there may be provided an automatically powered or a hand wheel adjusting system to which are connected the delivery carriage conveyor, a stop for the reciprocating collection platform, the center clamping means and its cooperating center rotatable portion of the cutting table, and the take-off rollers above the take-off tape conveyor. This system moves all these devices simultaneously toward or away from the disk cutters to provide respectively for smaller or larger sized sheets and the disks to be cut therefrom.

The power for the reciprocating platform and the clamping pivot means, the grabbing means or spears and their stops, etc. may be provided by hydraulic or air cylinder motors, or by electrical solenoids, and their operation may be controlled by timers and/or sensers.

BRIEF DESCRIPTION OF THE DRAWINGS

The above mentioned and other features, objects, and advantages, and the manner of attaining them are described more specifically below by reference to an embodiment of this invention shown in the accompanying drawings, wherein:

FIG. 6 is a plan view of the cutting table shown in FIG. 1, showing in dotted lines large and small sized disks and how they are grabbed by the edge clamping pivot means to be spun off the cutting table; and FIG. 7 is a reduced perspective view similar to FIG. 1 with many parts broken away in order to show the adjusting system mechanism for simultaneously adjusting the delivery carriage, the stop for the reciprocating collection platform, the center clamping pivot means and its cooperating rotatable center portion on the cutting table, and the take-off rollers, for adapting the machine to cut different sized disks as shown in FIG. 6.

DETAILED DESCRIPTION OF A PREFERRED EMBODIMENT

Figure 1:
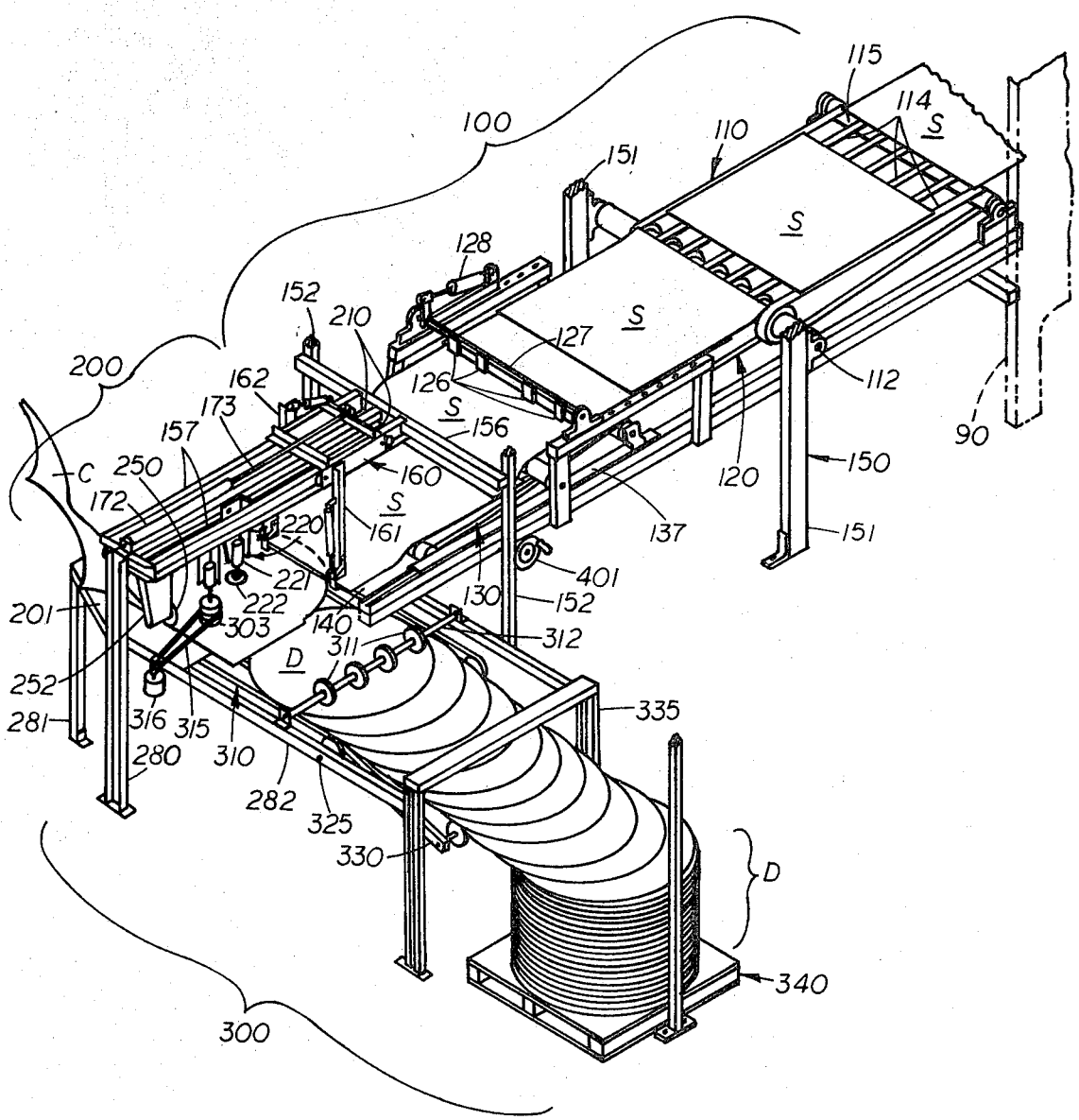
FIG. 1 is a perspective view of an automatic disk cutting machine according to a preferred embodiment of this invention showing the feeding means, cutting table, and the discharging means.

Since the automatic disk cutting machine of this invention comprises three separate parts plus means for automatically adjusting these parts to provide for different sized disks, the following detailed description will be divided into four major sections having reference characters in the hundred sequence for each section corresponding thereto, namely, the feeder portion of the machine 100 (see FIGS. 1 and 2), the cutting portion 200 (see FIGS. 1, 3 and 4), the discharge portion 300 (see FIGS. 1, 3 and 5), and the automatic adjustment portions 400 (see specifically FIGS. 1, 6 and 7).

I THE FEEDING PORTION

Figure 2:
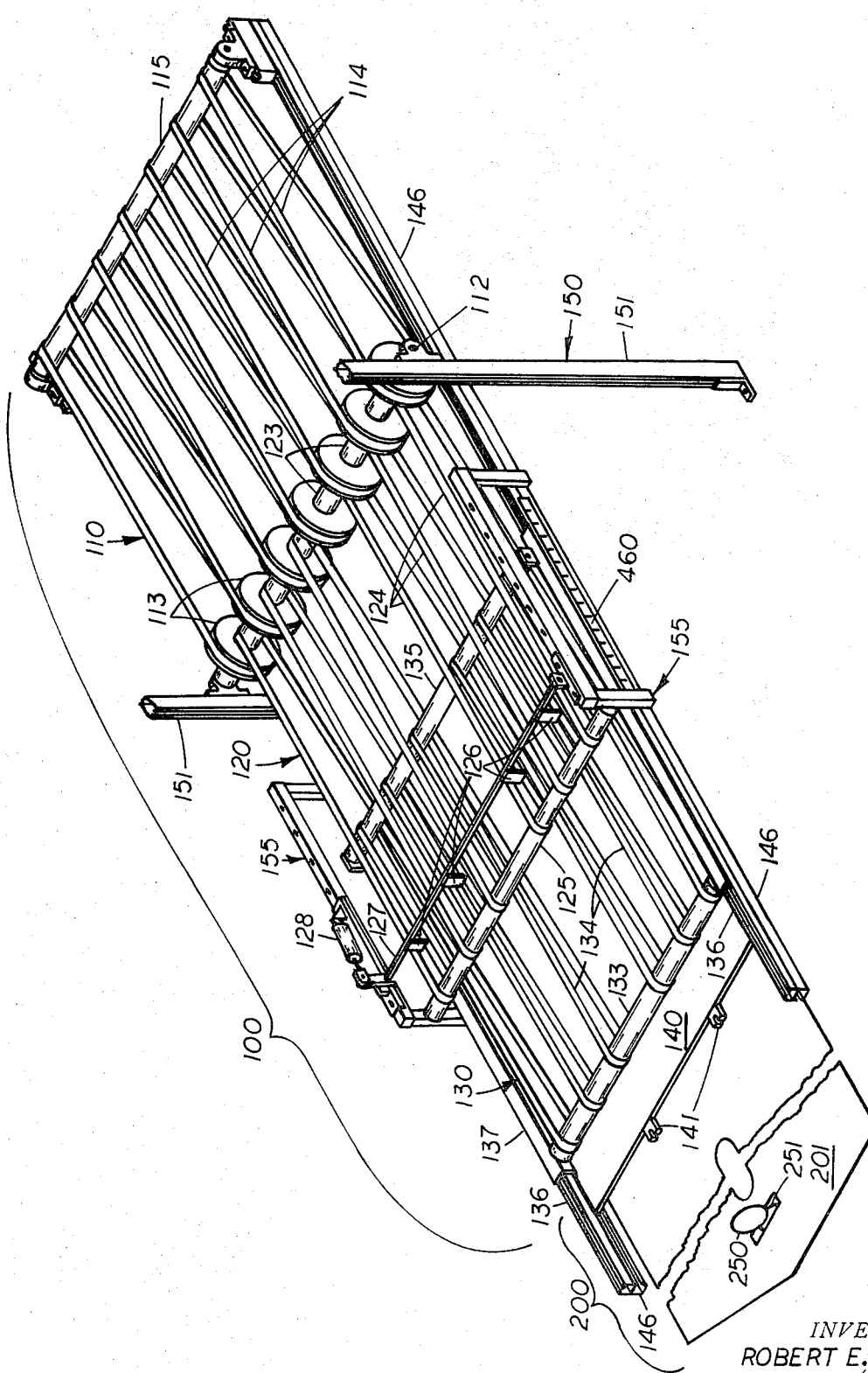
FIG. 2 is a slightly enlarged perspective view of the feeding means of the machine shown in FIG. 1, without the sheets thereon in order to show the two different speed tape conveyors, the adjustable delivery carriage conveyor, and the reciprocating collection platform with the anvils for the spears at its forward edge.

Referring first to FIG. 1, there is shown in the dotted lines in the upper right hand corner thereof, a frame 90 which may comprise part of a conventional machine for cutting the square sheets S. These sheets S may be of paper taken from rolls that feed this cutting machine and slice the paper web transversely at equal distances corresponding to the width of the web to form these square sheets S. From the exit end of this machine, the square sheets A are fed onto the feeder mechanism 100 of this invention which comprises, as shown in FIGS. 1 and 2, a plurality of three belt or tape type conveyors 110, 120, and 130 in successive cascades slightly sloping downwardly, such as about a 3° angle, towards the cutting machine 200. At the discharge end of the third conveyor 130, there is a retractable collecting platform, and the traverse carriage mechanism 140 to position the square sheets S on the cutting table 201 adjacent the disk cutters 250, 251.

The first two conveyors 110 and 120 are shown to be driven from a common drive shaft 112 on which are spacedly mounted high speed driving pulleys 113 (see FIG. 2) around which tape belts 114 extend to an idler roller shaft 115 adjacent the exit end of the square sheet cutting machine. This combination forms the first high speed tape type conveyor 110 for the sheets S.

Between the pulleys 113 there are provided driving roller pulleys 123 around which belts or tapes 124 extend in the opposite direction from the belts 114 to an idler roller pulley 125 of the slower speed second tape type conveyor 120. This slower speed conveyor 120 causes the sheets S to overlap as shown in FIG. 1. Above this slower speed conveyor 120 near the exit end thereof is provided a plurality of abutting fingers 126 mounted on a rockable bar 127 actuated by a hydraulic or air cylinder 128 controlled by a timer, senser or counting mechanism (not shown) to release the abutments 126 when a predetermined thickness or number of sheets S have been stopped against them thereby forming a stack of sheets S. This stack, in the case of paper sheets, may be about one tenth of an inch or five or six square sheets, depending of course upon the thickness of the paper. Thus as the square sheets S are fastly fed from the conveyor 110 onto the slower conveyor 120, they are stacked together until the predetermined number abut against the fingers 126 at which time the fingers 126 are tilted upwardly by the action of the cylinder 128 so that the stack can pass off the end of the second conveyor 120 over its pulley roller 125 onto the third conveyor 130 which is longitudinally adjustable depending upon the size of the sheets being fed to the cutter 200.

As shown in FIG. 2, this third conveyor 130 also comprises a plurality of tape belts 134 which are driven by one of its end roller pulleys 133 or 135. This conveyor 130 feeds the stacks of sheets S released by the abutment fingers 126 onto the retractable collection platform or table 140 which partially overlaps the cutting table 201 when in its extended position of the cutting machine 200. The forward edge of this platform 140 is provided with a pair of forked shaped anvils 141 which cooperate with the piercers or grabbing means 161, 162 on a longitudinally movable traverse carriage 160, which comprises the last part of the feeding mechanism portion 100.

Since the third conveyor 130 and platform 140 are longitudinally movable, their sides are mounted in slide channels 136 and 146, respectively, the platform 140 being adjustable toward and away from the rotary disk cutters 250 and 251 depending on the size of the disks to be cut. Thus, the conveyor 130 is mounted on a slidable frame 137 which journals the ends of the roller pulleys 133 and 135 and which frame 137 slides in the upper parallel tracks or channels 136. This horizontal adjustment may be by a screw mechanism described later in part IV below in connection with FIG. 7 controlled by the manual adjustment handle 401 shown in FIGS. 1 and 7.

The reciprocating platform 140 is operated by an air or hydraulic cylinder (not shown) which is operated each time a stack is pulled to the disk cutters 250 and 251, when the disks to be cut are greater in diameter than the forward extended distance of the platform 140. Thus the reciprocating distance of this platform is varied depending upon the diameter of the disks being cut. The fully retracted position of this collection table or platform 140 is shown in full lines in FIG. 3, exposing the whole top of the cutting table 201 for the largest sized disks that can be cut; and from its dotted line position 140' shown in FIG. 3, for disks having a diameter smaller than the distance between the forward position of the platform 140 and the disk cutters 250, 251, this platform 140 is not reciprocated at all.

All of these feeding mechanisms may be supported by a frame 150 which may comprise a plurality of pairs of vertical legs or posts 151 and 152 (see specifically FIG. 1). Between these pairs of posts there are provided the channels or tracks 136 and 146 at the output ends of which the adjustable conveyor 130 and the retractable platform 140 slide. Mounted between the pairs of legs 151 and 152 and above the channels 136 and 146, there is provided an additional sub-frame 155 for the support of the abutment finger mechanism 126, 127, 128 which also may be adjustable along the conveyor 120.

Figure 3:
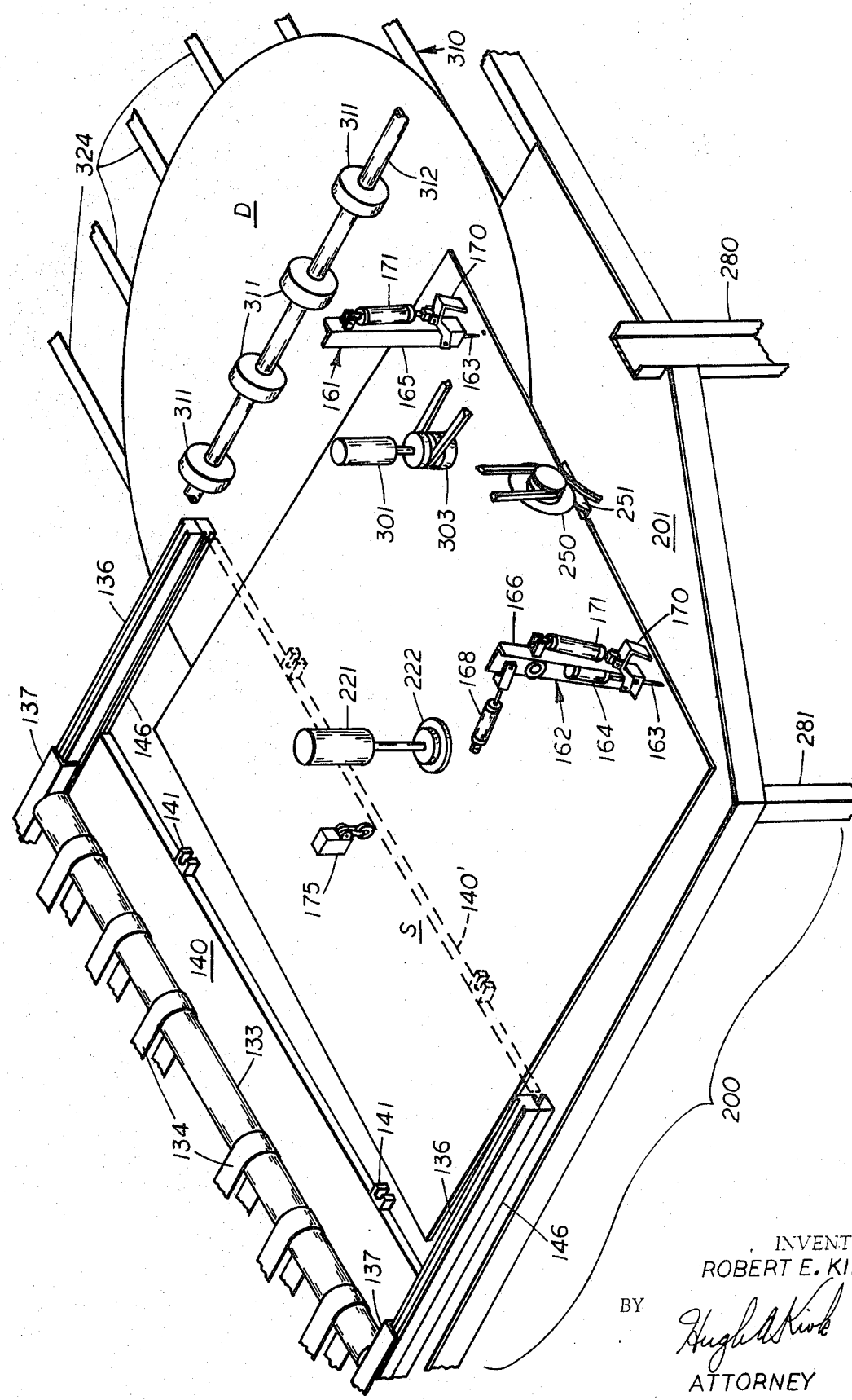
FIG. 3 is a still further enlarged perspective view of the cutting table shown in FIG. 1, with parts broken away to show more clearly how a stack of square sheets is pulled and clamped thereon adjacent the continuously rotating cutters.
Figure 4:
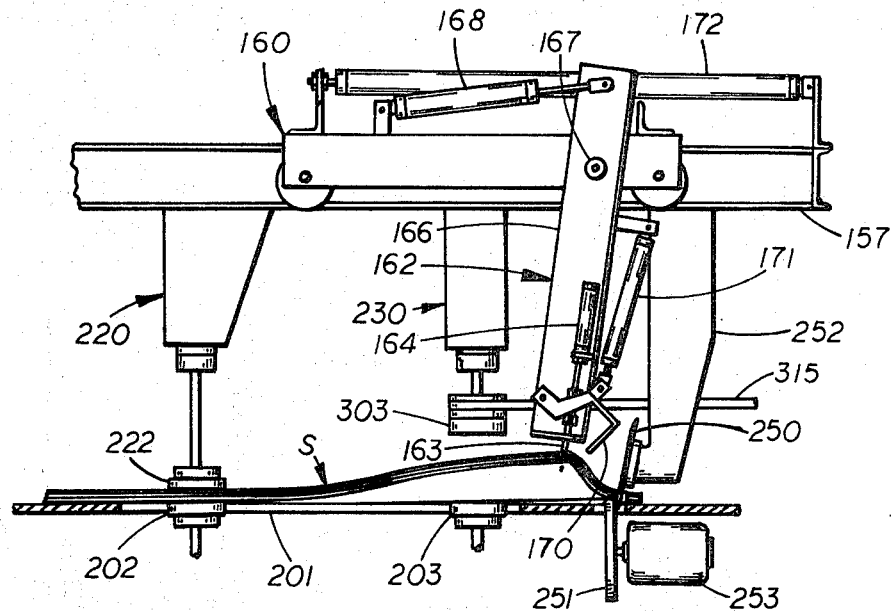
FIG. 4 is an enlarged side elevation of part of the cutting tale shown in FIGS. 1 and 3 showing the center clamping pivot means holding a stack of sheets, and one of the spears being moved angularly for starting the rotation of the stack through the cutters.
Figure 5:
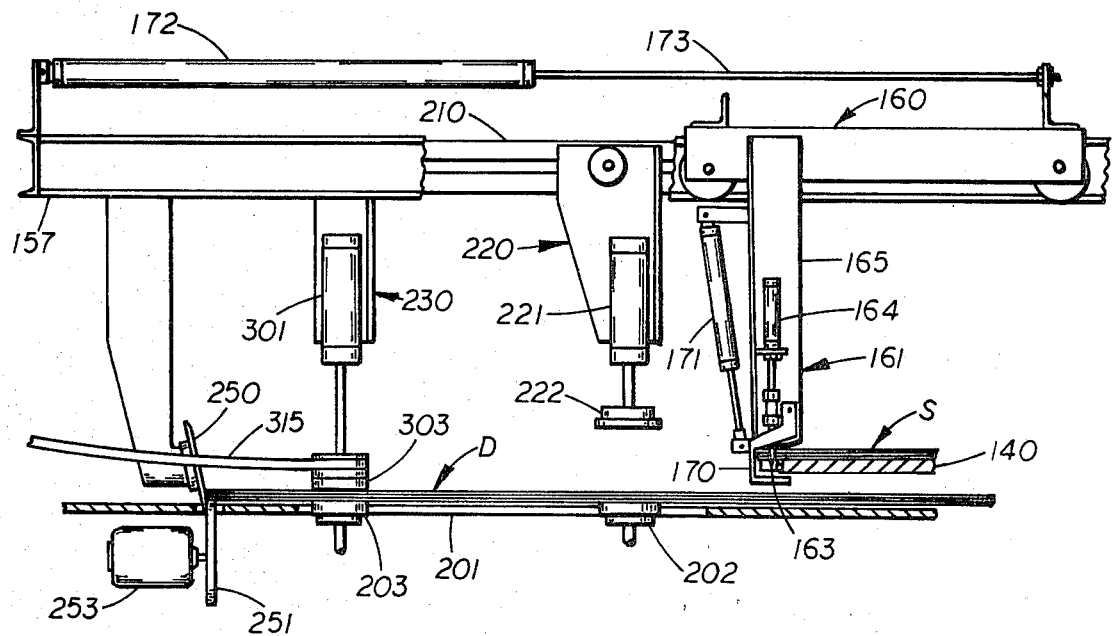
FIG. 5 is a view similar to FIG. 4 but of the other side of the cutting table showing the edge clamping pivot means engaging the periphery of a stack of cut disks to spin them off from the cutting table while the spears engage the next stack of sheets at the edge of the collection platform to pull them onto the cutting table to be cut.

Between the tops of the legs 152 as shown in FIG. 1 and above the conveyor 130 and platform 140, there is provided a cross beam 156 to which one end of a pair of guide rails 157 is attached. The other ends of these rails 157 are attached to an upwardly extending leg 280 for the cutting table 201. Between these guide rails 157 there is provided the traverse carriage 160 from which depends the grabbing means 161 and 162 comprising herein spears 163 which cooperate with the anvils 141 on the forward edge of the collection table or platform 140. These piercing means or spears 163, shown in greater detail in FIGS. 3, 4 and 5, are operated by reciprocating cylinder motors 164 mounted on depending arms 165 and 166, the former being rigidly attached to the carriage 160 and the latter being pivotally attached at 167 thereto (see FIG. 4) and is rocked by another cylinder motor 168. Also mounted on the arms 165 and 166 are pivoted anvil supports and sheet stops or abutment members 170 which comprise pivoted U-shaped clamps that in their extended position fit under the anvils 141 and act as abutments for aligning the stack of sheets S as they slide off the conveyor 130 to the extended edge of the platform 140 (see FIGS. 1 and 4). These pivoted supports 170 are controlled by additional cylinder motors 171 mounted on the depending arms 165 and 166, and are retracted as shown in FIG. 3 once the stack of sheets S have been pierced or grabbed by the spears 161 and 162.

Thus the traverse carriage 160 reciprocates from the position shown in FIG. 1 to that shown in FIG. 3 along the rails 157 controlled by cylinder motor 172 and its piston rod 173 mounted above the rails 157 in timed sequence with the other parts of the system. As soon as the sheets S in the stack reach the supports or abutments 170 of the depending grabbing means 161, 162 they are sensed by a sensing switch 175 depending from the rails 157 to the edge of the platform 140. This sensing switch 175 operates the spears 163 to pierce through the stack of sheets S near their corners in the parts which will be cut off by the cutters 250, 251. Then these pierced sheets S are pulled by the movement of the traverse carriage 160 from the position shown in FIG. 1 to the position shown in FIG. 3 so that the edges of the sheets S abut up against the disk cutters 250 and 251 (see also FIGS. 4 and 5) at which time the one grabbing means 161 is operated to retract its spear or piercer 163. However, before a similar action occurs for the other grabbing means 162, its cylinder motor 168 is operated so that its spear 163 will give a kick to that side of the stack of sheets S and shown in FIGS. 4 before its spear 163 is retracted, so as to start the stack of sheets S in their proper rotation through the continuously rotating disk cutters 250 and 251.

II THE CUTTING PORTION

As soon as the stack of sheets S have been delivered adjacent the disk cutters 250, 251 and before the grabbing means have been released as just stated above, this stack of sheets S is clamped into position on the cutting table 201. This is accomplished herein by a pair of rotatable center clamping disks 202 and 222 (see FIGS. 4 and 5). The former disk 202 is adjustably mounted in the center of the table 201, and the latter disk 222 is at the lower end of a vertically operated cylindrical motor 221 mounted on a depending arm 220 adjustably mounted along track 210 between the rails 157. Usually these two clamping disks 202 and 222 are freely rotating, however, the lower disk 202 may be driven if such is necessary to provide the necessary rotation for the sheets S for the operation of the cutters 250, 251. However, the friction of these continuously rotating disk cutters 250 and 251 once they start cutting by the action of the "kick" provided by the pivoted grabbing means 162, they will continue the rotation of the stack of sheets as shown in FIG. 1 and spin off the cut off corners C into a scrap bin or other receptacle provided therefor.

The upper disk cutter 250 may be supported from an additional depending arm 252 attached to the rails 157 and/or 210, while the lower disk cutter 251 is continuously driven by a motor 253 (see FIGS. 4 and 5) under the table 201.

In addition to the center clamping disks 202 and 222, there is also provided edge rotatable clamping disks 203 and 303. The former disk 203 is mounted near the edge of the table 201, and the latter disk 303 is mounted at the lower end of a vertically operated cylinder motor 301 on a depending arm 230 supported by one of the rails 157. The function of this edge clamping means will be described in the next part III below. Similarly one of its clamping disks 203 or 303 may be positively driven, such as by a belt 315 and a motor 316 mounted on the edge of the table 201 and shown in FIGS. 1 and 5.

The table 201 may be supported by legs 280 and 281 which also may support an extending frame 282 for the discharge section 300 of the machine.

III THE DISCHARGING PORTION

As soon as the disks have been cut from the stack of sheets as shown in FIG. 1, the cylinder motor 301 mounted on the depending arm 230 of the edge rotatable clamping disk 303 is operated to clamp the edge of the stack of the cut disks D against the rotatable clamping disk 203 in the table 201 as shown in FIG. 5 for moving the disks off the cutting table 201. This clamping action is done simultaneously with the retraction or release of the center clamping disks 202 and 222 so that the moment of inertia already provided by the rotation of the disks D about their centers will cause these disks D to pivot around an eccentric axis at their edge, which is the axis of the clamping disks 203 and 303. These edge clamping disks 203 and 303 release as soon as the disks D move off at right angles from the sheet S feeding direction and are discharged from the cutting table 201 into the hold-down rollers 311 of a take-off conveyor 310 (see FIGS. 1 and 3).

Once this stack of disks have their edges removed from the center clamping disks 202 and 220 and their edges are under the take-off rollers 311, the next stack of sheets S are ready to be pulled onto the cutting table 201 by the grabbing means 161 and 162, while the take-off conveyor 310 continuously pulls these just cut disks D away from the table 201 on its belts or tapes 324. These tapes 324 may be driven by a common shaft 325 with the tapes on an elevator conveyor 330, which moves up and down in a frame 335 to feed the stacks of disks D onto a pallet 340 as shown in FIG. 1.

IV THE ADJUSTABLE PORTIONS

Referring now to FIGS. 1, 6 and 7, the adjustment mechanism for different sized disks comprises a single manually operated crank wheel 401, which may be located along the frame of the feeding portion 100 adjacent one of its legs 152. This wheel 401 simultaneously adjusts the whole machine, namely the retraction of the collector table 140 and the feeding conveyor 130, both of the center clamping disk pivots 222 and 202 relative to the cutting disk cutters 250 and 251, and the retraction of the take-off rollers 311.

Referring now specifically to FIG. 7, the hand wheel or crank 401 is mounted on a shaft 402 which has keyed thereto a cross worm gear mechanism 403, connected to a shaft 404 which is threaded at one end 405 into a support 406 for the cutting table clamping disk 202, so as to move it toward and away from the disk cutters 250, 251. Simultaneously, with this motion a sprocket wheel 407 drives sprocket chain 408 to sprocket wheel 409 on a shaft 410 having a cross worm gear 411 for driving a shaft 412 threaded into a support 413 to move the upper center clamping pivot means 220 toward and away from the disk cutter 250, 251. Thus the two center clamping disks 222 and 202 are maintained in axial alignment for all different diameter disks. Similarly, the other end of the shaft 404 extends through a universal joint 415 to move a stop means 420 for limiting the back stroke of the reciprocating platform 140. Beyond and at the far end 421 of the shaft 404 are keyed a pair of sprocket wheels 422 connected via diverging sprocket chains 425 to side sprocket wheels 426 and 428 on threaded shafts 430 and 432, respectively, to move the slide frame 137 of the conveyor 130. The take-off rollers 311 also are moved by means of an additional sprocket wheel 440 connected onto the shaft 402 of the hand wheel 401 via sprocket chains 441 and 442 and sprocket wheels 443, 444 and 445 to a pair of spaced threaded parallel shafts 450 and 452 connected to nut means 454 and 456 that move a shaft 312 which supports the take-off wheels 311 along the frame 282.

Thus all of the parts of the machine necessary for changing the sizes of the disks are simultaneously and quickly adjustable by the operation of a single hand wheel 401. The amount of this movement may be gauged by a scale 460 (see FIG. 2) along the edge of the conveyor 130, which scale 460 may be calibrated directly to the diameter of the disks D to be cut by the machine.

It is to be understood that many different types of motor mechanisms such as air or hydraulic cylinders, or solenoids may be used for performing the reciprocating movements described. All of these may be controlled by electrical switches and timers so the proper sequence of each of the parts thereof will perform the function as described above in a rapid sequence, so that a large number of disks may be automatically cut with as little supervision by operators as possible.

While there is described above the principles of this invention in connection with specific apparatus, it is to be clearly understood that this description is made only by way of an example and not as a limitation to the scope of this invention.

I claim:
1. An automatic disk cutter comprising:
   A. a cutting table having:
   1. a pair of rotary cutters adjacent one edge thereof, and
   2. A central rotary portion,

B. means for intermittently feeding square sheets onto said table adjacent said cutter, and
C. means for clamping said sheets at their centers against said rotary portion of said table.

2. A disk cutter according to claim 1 wherein said feeding means comprises a horizontal reciprocating means.

3. A disk cutter according to claim 1 wherein said feeding means comprises a plurality of continuously operating tape type conveyors, the former of which has a greater speed than the latter.

4. A disk cutter according to claim 3 wherein said different speed conveyors are driven from the same shaft having different sized pulleys thereon, with larger pulleys for the higher speed conveyor and smaller pulleys for the lower speed conveyor.

5. A disk cutter according to claim 1 wherein said feeding means includes a grabbing means which engages near the corners of said sheets and pulls them adjacent said rotary cutters.

6. A disk cutter according to claim 5 wherein said grabbing means comprises a pair of retractable spears which pierce said sheets.

7. A disk cutter according to claim 5 wherein said grabbing means includes means for starting the sheets to rotate about said clamping means.

8. A disk cutter according to claim 1 wherein said clamping means comprises a vertically reciprocating means.

9. A disk cutter according to claim 1 including means for starting said sheets to rotate about said clamping means.

10. A disk cutter according to claim 9 wherein said starting means is connected to said feeding means.

11. A disk cutter according to claim 1 including means for removing the disks cut from said sheets from said table comprising additional disk clamping means for clamping said disks near their peripheries so that the rotational inertia of said disks move said disks away from said center clamping means.

12. A disk cutter according to claim 11 wherein said additional disk clamping means comprises a vertically reciprocating means.

13. A disk cutter according to claim 12 wherein said vertically reciprocating means includes means for positively rotating said additional disk clamping means.

14. A disk cutter according to claim 11 wherein the removing means includes an up-from-the-bottom stacking means for the disks removed from said cutting table.

15. A disk cutter according to claim 1 including means for simultaneously adjusting said feeding means and said clamping means toward and away from said rotary cutters for cutting different diameter disks.

16. An automatic disk cutter comprising:
A. a table having:
  1. a pair of rotary cutters adjacent one edge thereof, and
  2. a central rotary portion,
B. means for intermittently feeding square sheets onto said table adjacent said cutter,
C. means for clamping said sheets at their centers against said rotary portion of said table, and
D. means for starting said sheets to rotate about said clamping means.

17. A disk cutter according to claim 16 including means for removing the disks cut from said sheets from said table comprising means for clamping said disks near their peripheries whereby their rotational inertia removes said disks from said table.

18. A disk cutter according to claim 17 including an up-from-the-bottom stacking means for said removed disks.

19. A disk cutter according to claim 17 including means for simultaneously adjusting said feeding means, said clamping means, and said removing means toward and away from said cutters for cutting different diameter disks.

20. An automatic disk cutter comprising:
A. a table having:
  1. a pair of rotary cutters adjacent one edge thereof, and
  2. a central rotary portion adjustable toward and away from said cutters,
B. horizontally reciprocating means for intermittently feeding square sheets onto said table adjacent said cutter,
C. a first vertically reciprocating means for clamping said sheets at their centers against said rotary portion of said table adjustable towards and away from said cutters,
D. means connected to said feeding means for starting said sheets to rotate about said clamping means, and
E. means for removing the disks cut from said sheets from said table comprising a second vertically reciprocating means for clamping said disks near their peripheries whereby their rotational inertia removes said disks from said first clamping means.

* * * * *